United States Patent
Becker et al.

(10) Patent No.: US 6,598,119 B2
(45) Date of Patent: Jul. 22, 2003

(54) DATABASE MANAGEMENT SYSTEM WITH A MULTIPLE-LEVEL CACHE ARRANGEMENT

(75) Inventors: Richard Alan Becker, Mendham Township, Morris County, NJ (US); Allan Reeve Wilks, Scotch Plains, NJ (US)

(73) Assignee: AT&T Corp., New York, NY (US)

( * ) Notice: Subject to any disclaimer, the term of this patent is extended or adjusted under 35 U.S.C. 154(b) by 281 days.

(21) Appl. No.: 09/780,633

(22) Filed: Feb. 9, 2001

(65) Prior Publication Data

US 2002/0112123 A1 Aug. 15, 2002

(51) Int. Cl.$^7$ .............................................. G06F 12/00
(52) U.S. Cl. ..................... 711/119; 711/141; 711/165; 705/1; 705/2; 705/5; 707/201; 707/104.1
(58) Field of Search ................. 705/1, 2, 3; 707/201, 707/202, 205, 104.1, 102; 711/119, 122, 124, 126, 133, 134, 135, 141, 142, 143, 165

(56) References Cited

U.S. PATENT DOCUMENTS

| | | | | |
|---|---|---|---|---|
| 5,553,265 A | * | 9/1996 | Abato et al. ................ | 711/143 |
| 5,627,993 A | * | 5/1997 | Abato et al. ................ | 711/143 |
| 5,628,014 A | * | 5/1997 | Cecchini et al. ............ | 707/205 |
| 5,778,422 A | * | 7/1998 | Genduso et al. ............ | 711/117 |
| 5,809,530 A | * | 9/1998 | Samra et al. ................ | 711/140 |
| 5,909,697 A | * | 6/1999 | Hayes et al. ................ | 711/144 |
| 5,963,963 A | * | 10/1999 | Schmuck et al. ........... | 707/205 |
| 6,073,212 A | * | 6/2000 | Hayes et al. ................ | 711/122 |
| 6,321,304 B1 | * | 11/2001 | James ......................... | 711/141 |
| 6,438,659 B1 | * | 8/2002 | Bauman et al. ............. | 711/141 |
| 2002/0103976 A1 | * | 8/2002 | Steely et al. ................ | 711/135 |

OTHER PUBLICATIONS

Richard A. Becker, "Fundamentals of Data Structures," Computer Science Press, 1976, pp. 496–517.

* cited by examiner

*Primary Examiner*—Donald Sparks
*Assistant Examiner*—C. P. Chace

(57) ABSTRACT

A data management system for storing data in a multiple-level cache arrangement of a database comprises a multi-tier cache memory for initially storing all data in summary form in a secondary cache which may be the database; a processor for receiving requests for data and for moving requested data from the secondary cache to a primary cache, wherein, when subsequent requests for data are received, the primary cache is searched before the secondary cache; and for periodically synchronizing and merging all data in the primary cache back into said secondary cache to refresh said primary cache and remove stale information. The system is particularly useful for managing a telecommunications system call detail summary database in which telephone call details are collected as AMA records after the calls terminate and the AMA records are forwarded to a call detail database for storage in summary form and analysis by an external system, for example, for fraud analysis or billing purposes.

18 Claims, 7 Drawing Sheets

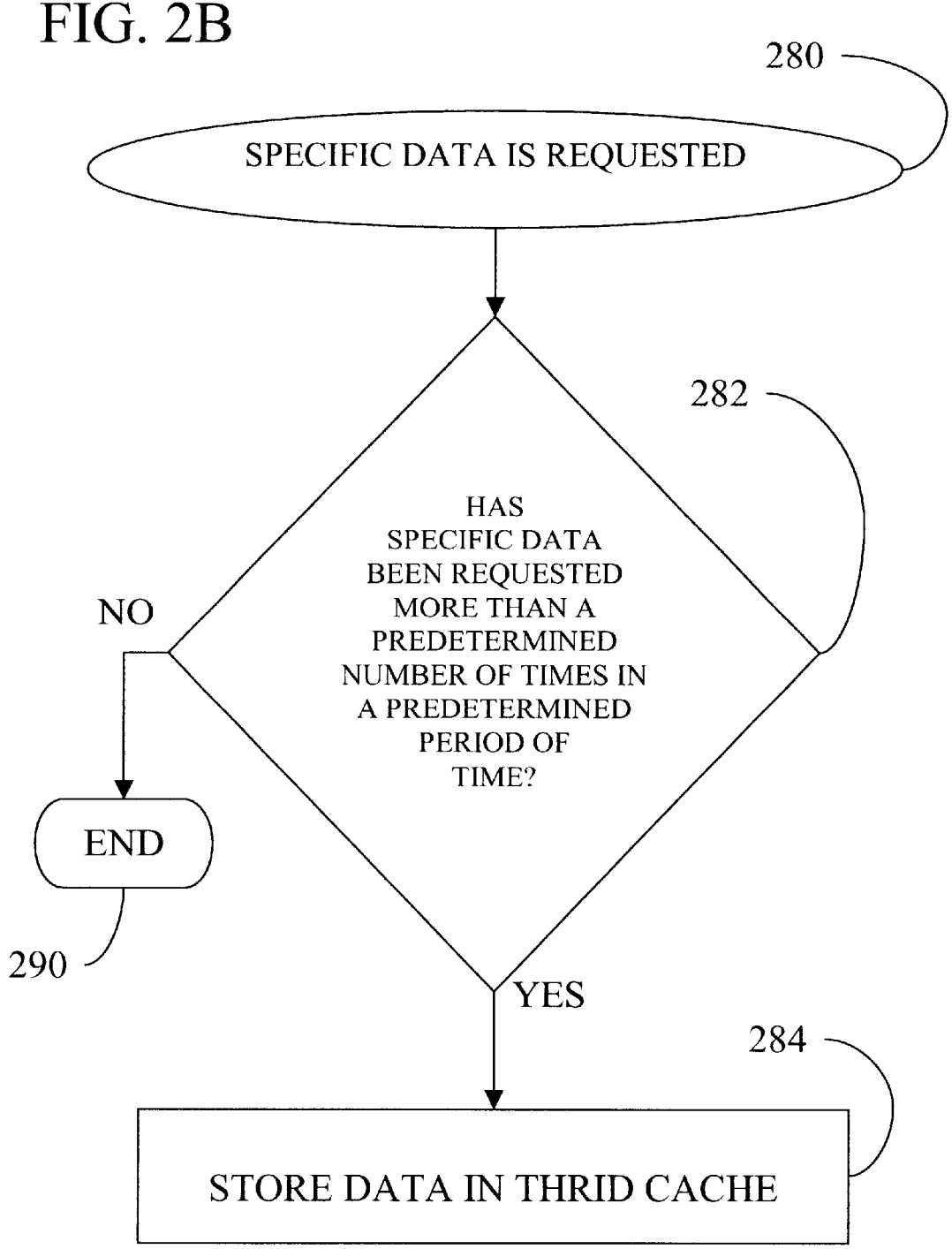

DATABASE MANAGEMENT SYSTEM WITH A MULTIPLE-LEVEL CACHE ARRANGEMENT

FIELD OF THE INVENTION

The invention relates to a method and apparatus for storing information, and particularly to a data storage system which uses a multiple-level cache arrangement wherein data may be initially in a secondary cache and is moved from a secondary cache to a primary cache when the data is first requested by a system.

BACKGROUND OF THE INVENTION

Because immediate access to information has become a necessity in virtually all fields of endeavor, including business, finance and science, telecommunication system usage is increasing at a substantial rate. With the increase in overall usage, the amount of information generated by the telecommunication systems has also exploded. Typically, each call made on a telecommunication system generates a variety of information, for example, billing and other information. For example, one telephone call may involve an Internet service provider, a wireless carrier, a local exchange carrier and a long-distance carrier among other entities. Each of these entities may have its own way of pricing their portion of a telephone call involving equipment charges, service charges, access charges and other charges appearing on one or several bills to a subscriber. All of this information can be analyzed for a variety of purposes such as billing, fraud control, detecting trends and characteristics of each telephone number (directory number or other billing number or indicia of a subscriber) in a telecommunication system. For each of these purposes, a processor in the analysis system accesses the call information, e.g., call detail, specifying various call parameters. For example, the analysis system may want to analyze the 100 most recent calls for a particular telephone number. The call detail information, which is stored in the telecommunication system, is then gathered from the database and sent to the analysis system requesting the information. The gathering process takes time and resources. Furthermore, as the amount of information in storage increases, the amount of time needed to search for requested information also increases. Thus, there is a need for a data management system which efficiently stores data in a manner that allows for faster searching for requested data.

SUMMARY OF THE INVENTION

According to one embodiment of the invention, a method and data management system stores data in a multiple-level cache arrangement of a database. Data may be initially stored in a secondary cache (which may be the database). When data is requested, the data is moved from the secondary cache to a primary cache. When a new search for data is initiated, the search begins with the primary cache and then proceeds to the secondary cache, if necessary.

According to one embodiment of the invention in a telecommunications system application, a method and apparatus for storing data in a multiple-level cache arrangement of a database is disclosed. Initially, all data for telephone numbers is stored in a secondary cache (which may be the database). When a request for data is received, the requested data is moved from the secondary cache to a primary cache, wherein when subsequent requests for data are received, the primary cache is searched before the secondary cache. Finally, all data in the primary cache is periodically merged back into the secondary caches so that both the primary and secondary cache reflect similar information and old data may be purged.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention.

FIG. 2B is a flowchart illustrating one example of the operation of storing data to a third cache;

DETAILED DESCRIPTION

The invention relates to a data management system which stores data in an efficient manner allowing faster searching of data. The data management system is particularly effective in systems in which large amounts of data need to be stored and a small amount of stored data is repeatedly requested. One such system is a telephone system like the exemplary system illustrated in FIG. 1. It will be understood that the invention is not limited to being implemented in a telephone system but rather the invention can be implemented in many other types of systems.

According to one embodiment of the invention, the data is divided into a plurality of categories—for example, two. Data can be referred to as inactive or quiet if the data has not been requested within a predetermined period of time, and data can be referred to as active if the data has been requested within the predetermined period of time. Data is initially stored in a secondary cache which may be a database. As will be explained below with reference to FIGS. 3–5, data is moved from a secondary cache for quiet data to another cache, a primary cache for active data, when data is requested, and subsequent searches for data are then first performed using the primary cache containing active data and then performed on the secondary cache containing quiet or inactive data if necessary. It is important to note that the invention is suited for a situation in which the different pieces of data in the secondary cache are requested at different rates. For example, in a telephone system, if everyone made one telephone call per day, then the primary and secondary caches would become the same size. However, it has been observed that a small number of the total number of telephones account for a large number of all of the calls made during a day.

Figure 1:
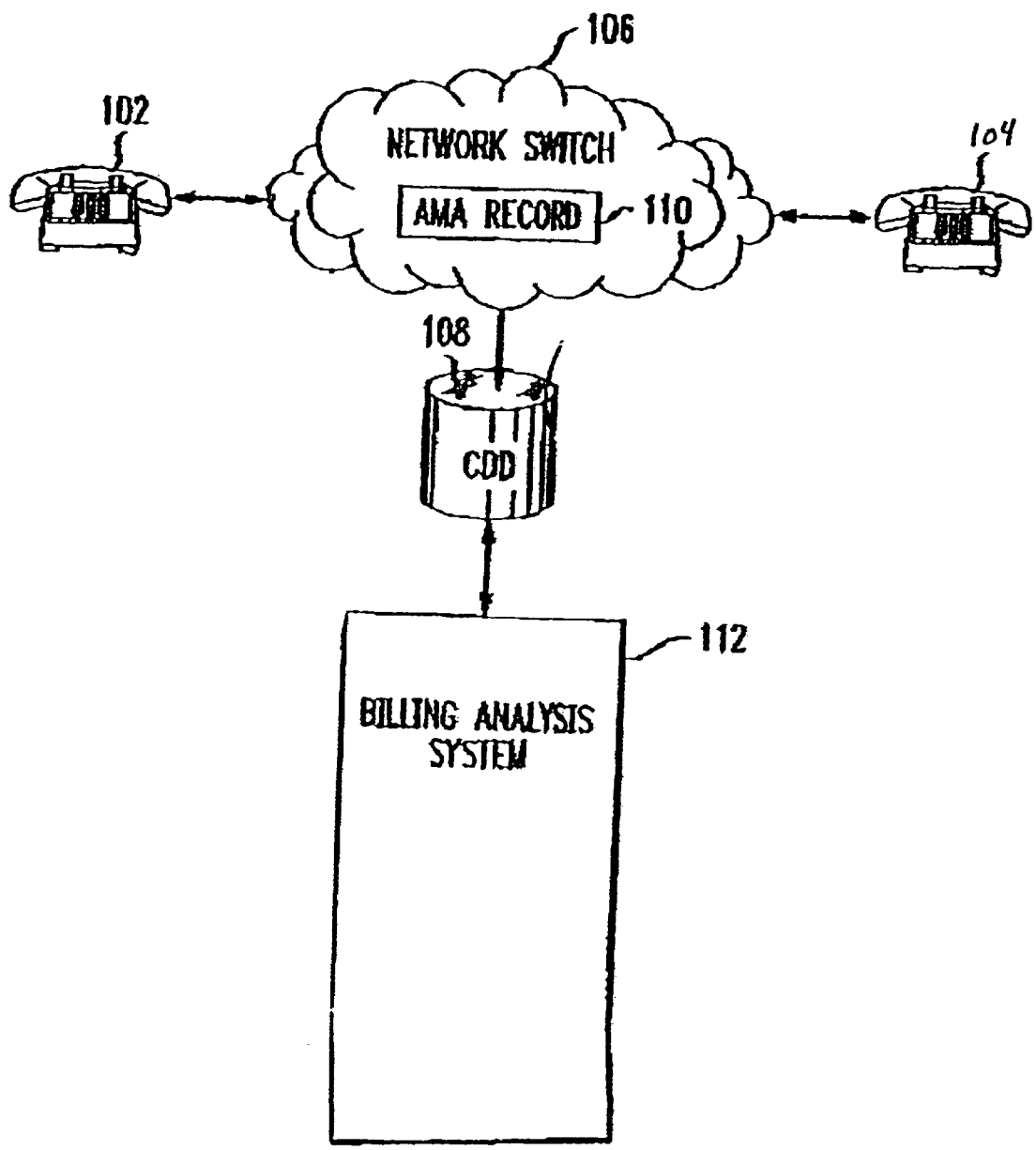
FIG. 1 illustrates a block diagram of a telephone system which can implement embodiments of the invention.

Referring to FIG. 1, there is shown a block diagram of an exemplary telephone system which can implement the invention. There is shown a calling telephone 102, a called telephone 104, a telephone network switch 106 and a Call Detail Database (CDD) 108 for storing call detail data in summary form as will be further described herein. An Automatic Message Accounting (AMA) record, represented by a block 110, is also shown. As indicated by FIG. 1, a billable call may be initiated at telephone 102 and routed through switch 106, e.g., a 4ESS switch, now manufactured by Lucent Technologies, Inc., to telephone 104. The switch 106 generates AMA record 110, which includes the information necessary to price the call. Typical AMA information includes a start or termination time of day and date, a directory or calling number and a called number, among other call details. The AMA record is passed to the CDD 108 for summary and storage by telephone number as an index. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it may be summarized and stored, indexed by telephone number as will be described herein and may be made available for use in pricing the call or for other purposes such as fraud analysis. To this end, a summary record in response to a query is passed to a billing or other analysis system 112, which may be a general purpose computer capable of running the software necessary to implement the invention. The present invention, however, relates to a database management system implemented more typically at CDD 108 to manage and provide efficient data storage.

An analysis system 112 can be a billing analysis system, a fraud control system and/or some other system which is used to analyze call detail summary information. The analysis system 112, in the billing analysis example, applies any customer-specific billing parameters to the AMA record summary to produce a processed AMA record summary. It then may pass the AMA record summary and the processed AMA record summary back to the CDD for storage.

According to one embodiment of the invention, a call detail record is received at CDD 108, where a host processor for CDD 108 accepts the record and identifies the telephone number associated with the record. The CDD system according to the present invention asks to see the summary of that telephone number's usage already in CDD 108. That record summary, referred to herein as a call detail record summary, is retrieved from storage using the multiple-level cache structure—for example, two tiers which may include the database itself, as will be discussed with reference to FIG. 2. The retrieved summary is read, updated and rewritten into the primary cache, even if it is retrieved from a secondary cache. This action ensures that the updated record will be quickly accessible on the next access. Thus, the present invention provides as fast an access as possible in a telecommunications network setting that is handling millions of telephone calls per day.

In keeping with the present invention, all of the billing information can be stored in a secondary (quiet) cache, which may be the database itself, at the beginning of each day. Then as specific billing data for particular subscribers is requested, for example, by the billing system or when new data comes in, the requested data record is moved from the secondary cache to a primary (active) cache. The active data then stays in the primary cache for a predetermined period of time—for example, an hour, a day, a week, etc.—at which point all of the data in the primary cache are merged back into the secondary cache, i.e., information from the primary cache is copied back into the secondary cache, removed from the primary cache and old information in the secondary cache may be dropped or revised in some known manner. These data processing details will be further explained with reference to FIGS. 3–5.

Figure 2:
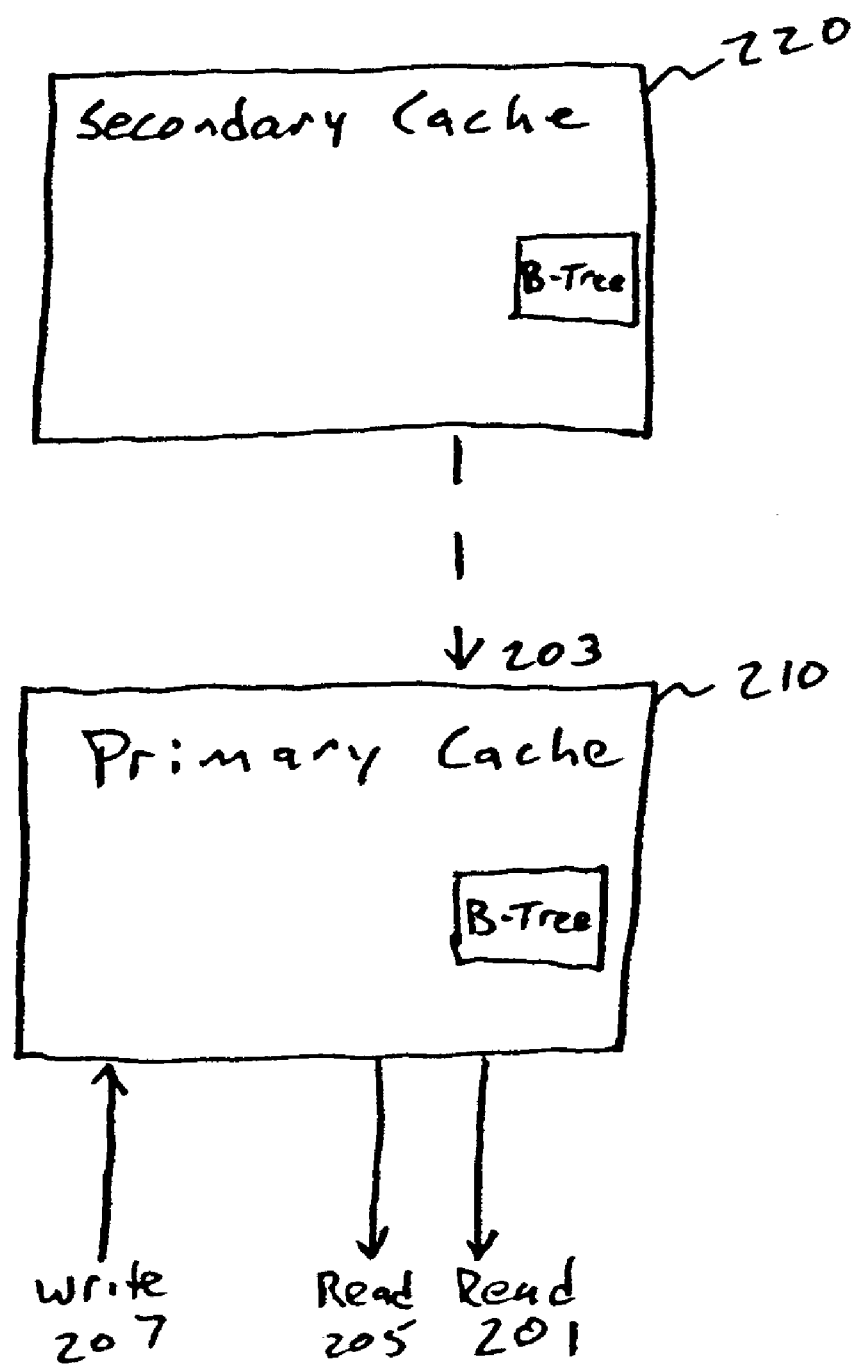
FIG. 2 illustrates a multiple-level cache arrangement according to one embodiment of the invention.

In one embodiment of the invention, two levels of caches are shown: primary and secondary, as shown in FIG. 2, where the secondary cache may be the database itself. It will be understood that more than two levels of caches can be used in this invention and the invention is not limited to a specific number of levels. For example, three levels of caches can be used: secondary, primary, and a third active cache. In this example, if specific data is requested more than a predetermined number of times during a predetermined period of time, the data can be moved from the primary cache to the third cache.

Figure 2A:
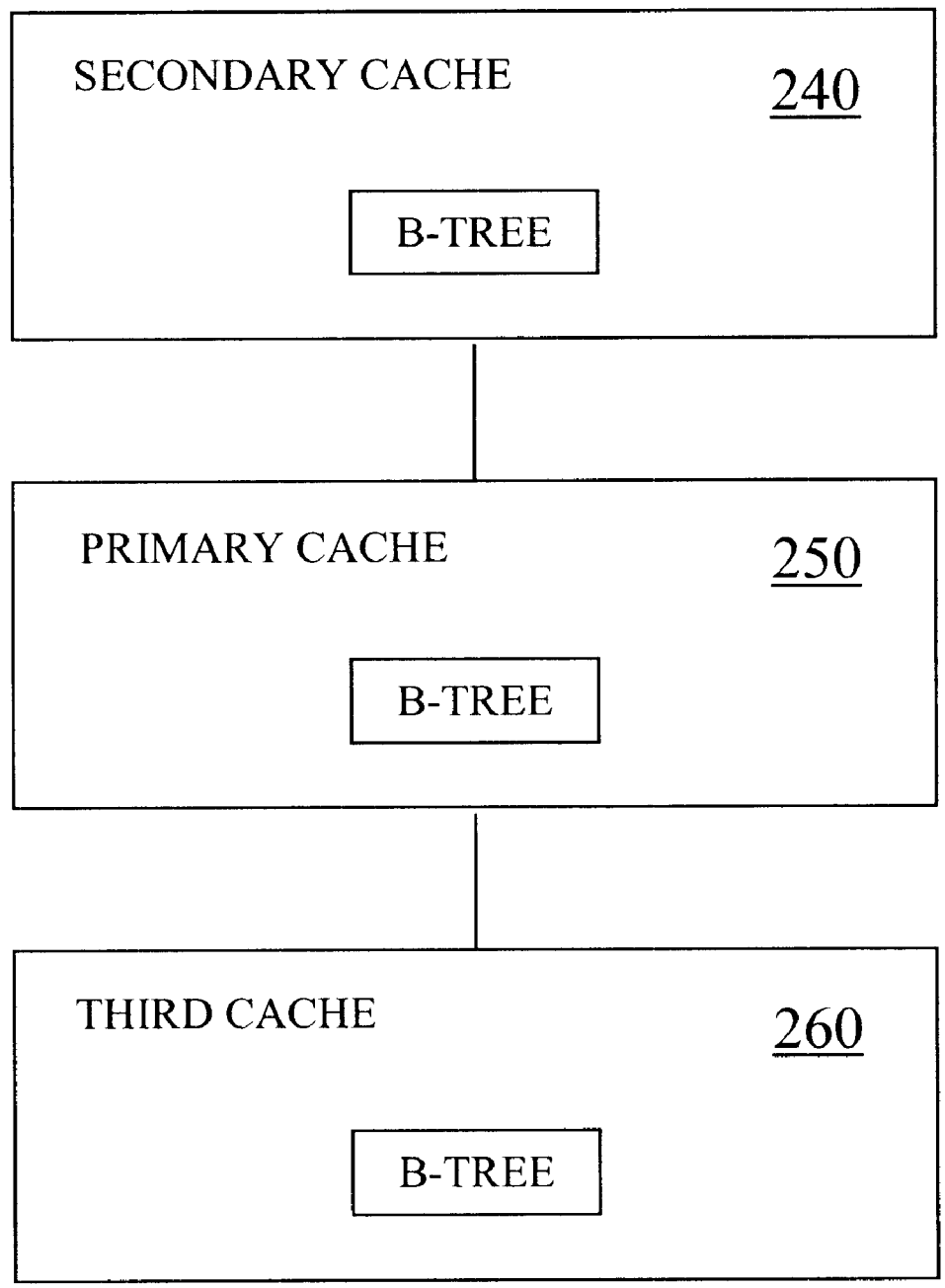
FIG. 2A illustrated a multiple-level cache arrangement according to one embodiment of the invention.

Referring to FIG. 2A, a three-tier illustrative embodiment is shown. The three-tier arrangement comprises a secondary cache 240, a primary cache 250, and a third cache 260. In particular, FIG. 2B shows a process for storing data in a third cache as shown in FIG. 2A. At specific data has been requested. At step 282, a determination is made as to whether the specific data has been requested more than a predetermined number of times during a predetermined period of time. If not, the process is exited at step 290. On the other hand, if the specific data has been requested more than a predetermined number of times during a predetermined period of time, at step 284, the data can be moved from the primary cache to the third cache.

In a two-tier embodiment, the secondary cache is synchronized each day at "synchronization" time and the data are marked read-only. By "synchronization" time herein is intended the time when some data is determined to be outdated for merging or otherwise determined to require replacement, movement from one cache to another or clearing or removal from cache memory altogether due, for example, to data staleness. For example, a telephone number may cease to appear in AMA records when a subscriber disconnects their telephone service and their associated data become stale.

The primary cache, a location of active data, is based on any activity since the synchronization process. Initially, its size is determined to be large enough to hold summary data collected from one synchronization time to the next. Thus it may be considered to be variable in size and is periodically cleared. This allows the primary cache to be much smaller than the entire universe of subscribers that are monitored.

Known cache memory is typically size-limited and information is typically migrated out of such cache memory when the memory approaches fullness or is full, which would occur asynchronously. The primary cache memory of the present invention is cleared out periodically or synchronously at synchronization time but not necessarily at regular intervals. Moreover, one time of day for synchronizing the primary and secondary caches may be intentionally chosen to be a non-busy hour, for example, in the middle of the night when traffic volume is at a minimum. The present invention, however, contemplates a combination of asynchronous (when one cache approaches a fullness state) and synchronous reaping (for example, every non-busy hour).

In one embodiment of the present invention, B-trees are used to access disc blocks already cached by the operating system. In alternative embodiments, other means for indexing data for retrieval may be utilized, and use of a B-tree is not critical to the present invention but is exemplary and is further discussed below. There exist several descriptions of B-trees; one such description may be found at Chapter 10 of *Fundamentals of Data Structures,* Computer Science Press, Potomac, Md., U.S.A., 1976.

In a B-tree embodiment, the telephone number as defined above is used as a key or index to access information regarding the telephone number. When information regarding a new call comes in, the call detail summary information already recorded regarding the telephone number is looked up. As illustrated in FIG. 2, a read operation 201 is first performed on the primary cache 210. If the desired information is not in the primary cache 210, a read operation 203 is then performed on the secondary cache 220. A B-tree (not specifically referenced with a reference numeral but shown) associated with each cache takes the telephone number as an input and outputs the location of the call detail summary information.

In a known database management system, a B-tree index is one means for rapidly and efficiently accessing each record in a database. A B-tree index has one apex root node and a plurality of nodes divided into branches at a number of hierarchical levels, diverging from the root node. Of the branched nodes, those nodes at the lowest level are often called leaf nodes. Those nodes other than the leaf nodes are often called upper nodes. The upper nodes include the root node. Each node has a plurality of index entries constituted by the following data. A leaf node entry typically has a key value and a pointer to the record in the database associated with the key value. An upper entry node has a pointer to a child node at the next lower level and one key value representative of the range of key values covered in the leaf nodes branched from the child node. The key value in an upper index entry functions as a guide (decision element) by which an access program searches in the B-tree index from the root node to the leaf node which has the index entry including the pointer to the target record.

Returning to a discussion of FIG. 2, the call detail summary information is read at 205. The information can then be updated and rewritten 207 back into the primary cache 210 regardless of where it is read from. When the information is read, typically the entire disk block containing that information is read. Unfortunately, disk reads are slow, so if the system is trying to keep up with a fast real-time feed of calls, the system is limited by the time it takes to read and rewrite the disk blocks. Thus, it is desirable to have a smaller number of disk blocks stored in the primary cache 210 and to have data initially written to a secondary cache until accessed.

Figure 3:
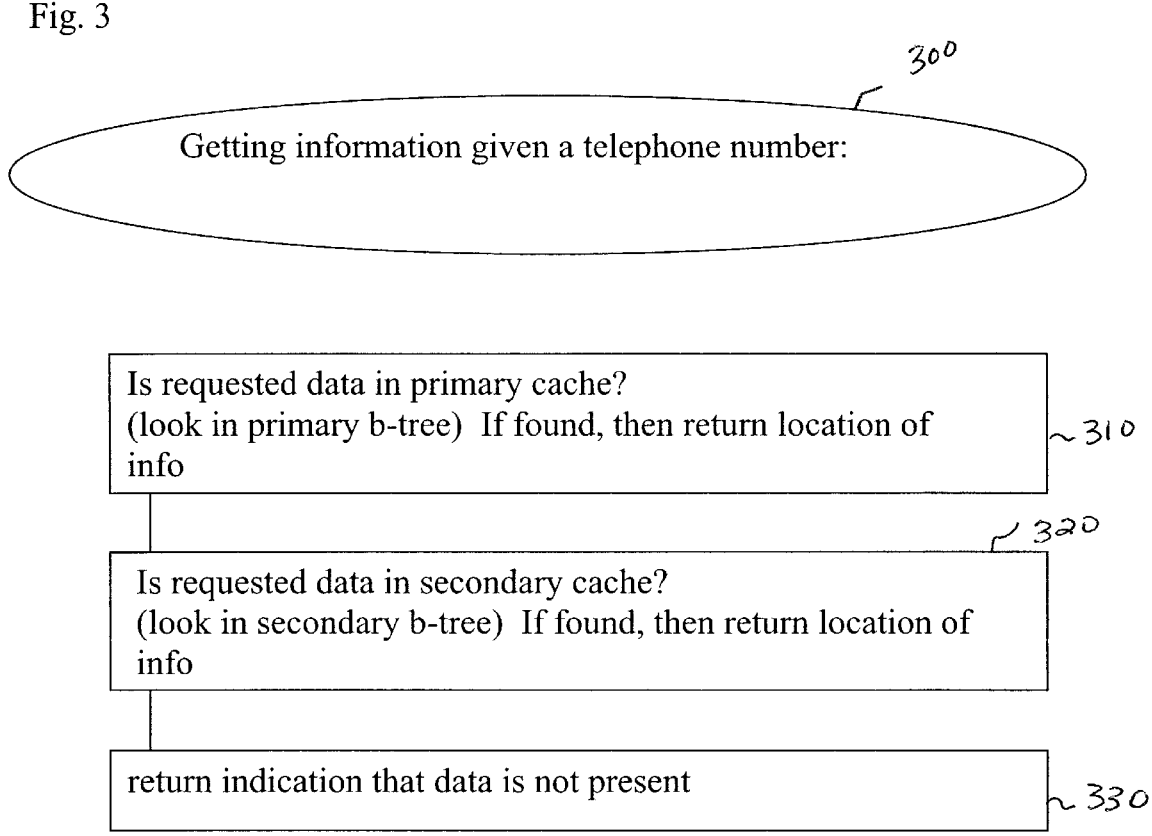
FIG. 3 is a flow-chart illustrating the operation of one embodiment of the invention for obtaining information for a given telephone number.
Figure 4:
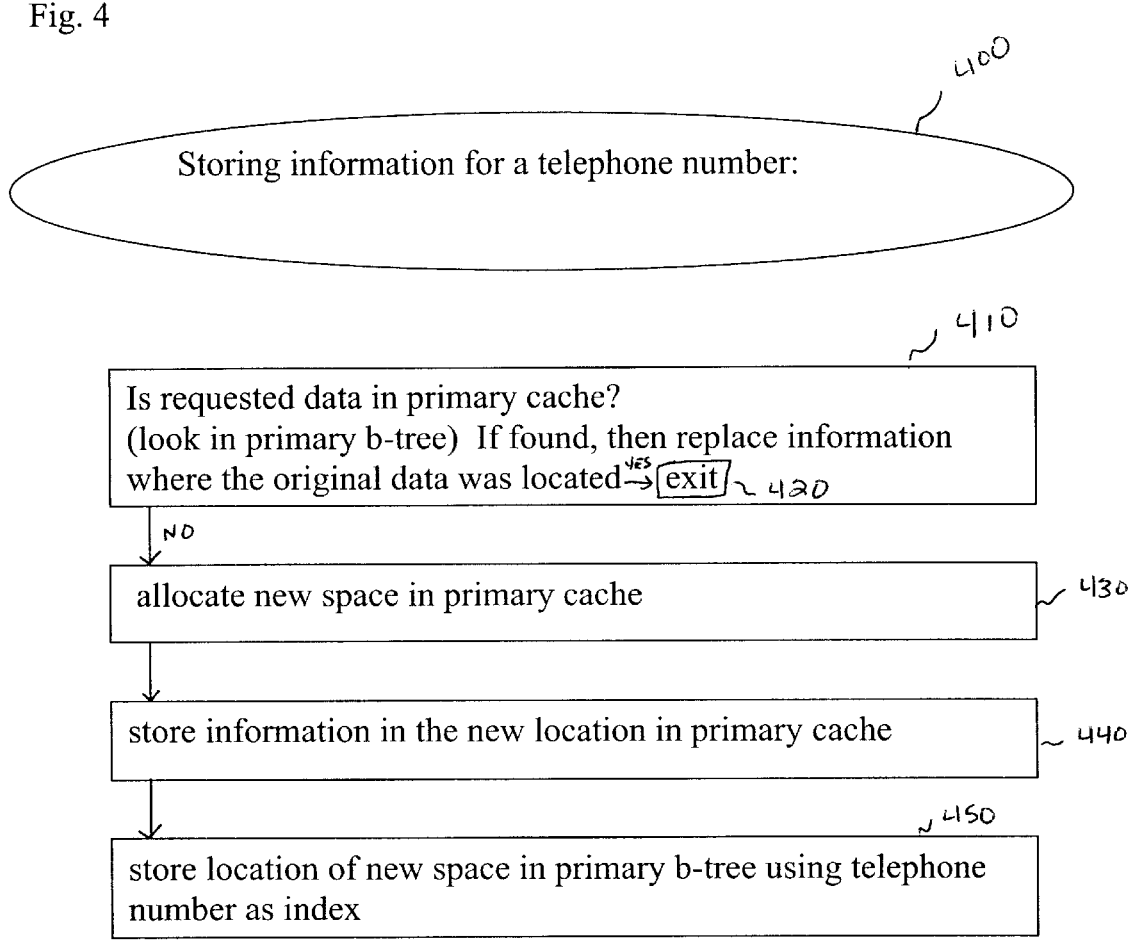
FIG. 4 is a flowchart illustrating the operation of one embodiment of the invention for storing information for a telephone number.
Figure 5:
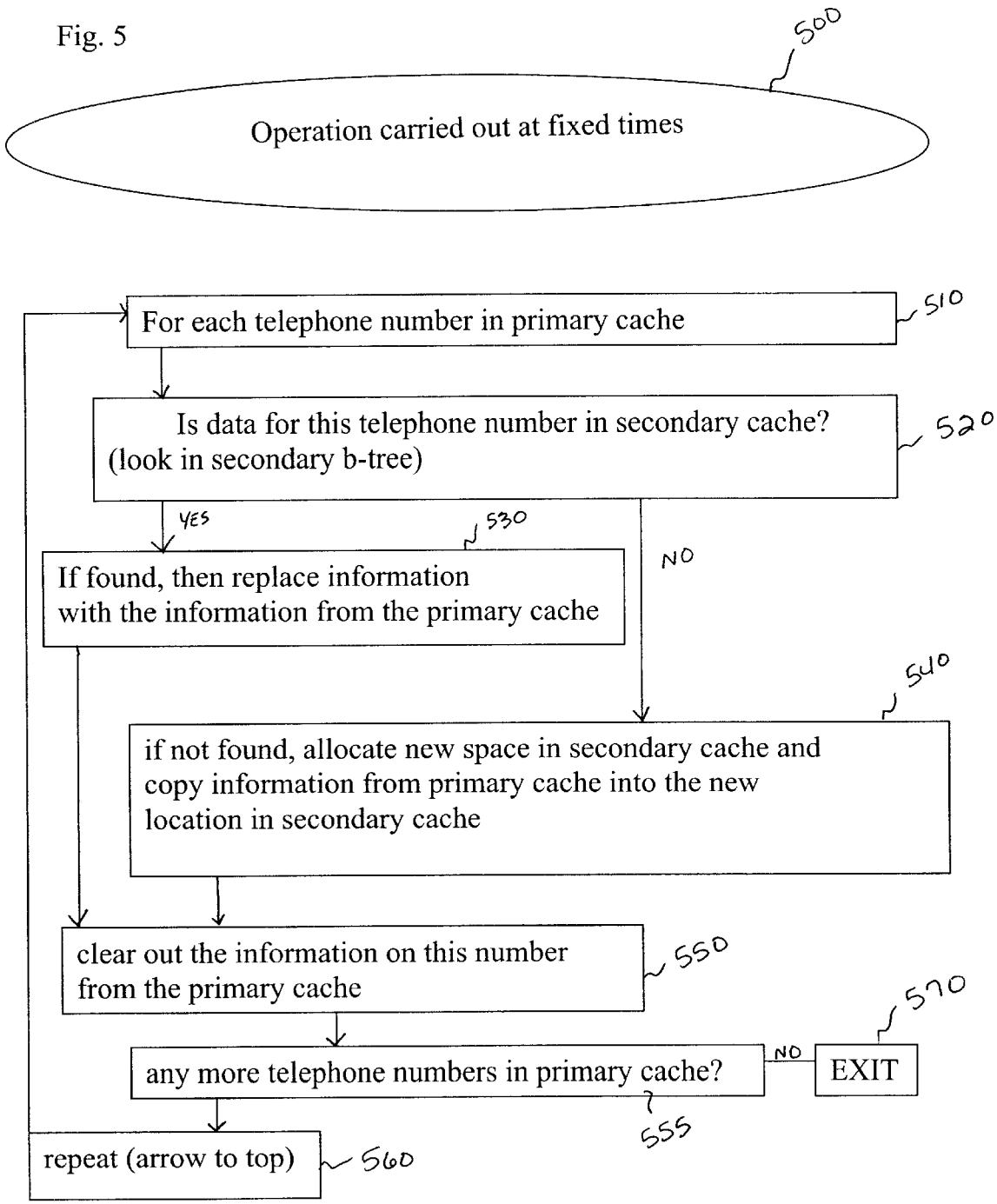
FIG. 5 is a flowchart illustrating the operation of one embodiment of the invention for periodically updating or merging information of primary and secondary caches for each telephone number.

FIGS. 3–5 are flow charts depicting the operation of one of the embodiments of the invention which uses a two level cache arrangement: primary (active) cache and secondary (inactive) cache which may be the database. Initially, all of the data is stored in the secondary cache. As data is requested, the requested data is moved from the secondary cache to the primary cache. Likewise, as new data is created, the new data is stored in the primary cache. As a new request for data is received, the primary cache is first searched to see if it contains the requested data. If the requested data is not in the primary cache, the secondary cache is searched. Finally, at a predetermined interval, the data in the primary cache is merged back into the secondary cache.

In particular, FIG. 3 shows a process for looking up information for a given telephone number in the primary and secondary caches shown in FIG. 2. At step 310, the system asks whether the requested data is in the primary cache 210 by looking in the primary B-tree (unlabeled). If found, then the location of the information is returned to the system in response to the telephone number request. At step 320, the system then asks whether the requested data for the telephone number is in the secondary cache 220 by looking in the secondary B-tree (unlabeled). If found, then the location of the information is returned to the system in response to the telephone number request. Thus, the system first looks to the primary cache and then to the secondary cache for information indexed by telephone number.

FIG. 4 refers to a process for storing information for a given telephone number after the initial process of loading a secondary cache with initial information. At step 410, the system asks whether the requested data is in the primary cache 210 (again, by looking in the primary B-tree). If found, then the information at the location where the original data is stored is replaced with the new or updated information. Then, the process is exited at step 420. On the other hand, if the requested data is not in the primary cache, then at step 430 new memory space is allocated in primary cache 210 for the data. At step 440, the information is stored in the new location in primary cache 210. Finally, so the data can be retrieved, the location of the new space is stored at step 450 in the primary B-tree using the telephone number as the index or key.

FIG. 5 shows a process of periodically merging or otherwise assuring data integrity and continuity. In a preferred embodiment, the process occurs synchronously or periodically and at a time of day when there is little traffic such as in the middle of the night. The process may also be practiced aperiodically, for example, when one cache memory achieves a certain degree of fullness. The process is carried out for each telephone number index into the primary cache at step 510. The system asks at step 520, is the data for this telephone number in the secondary cache 220? To do so, the secondary B-tree is looked to for this information. If the answer is "yes", then at step 530 the system replaces information with the information from the primary cache. If the answer is no, at step 540, and the information is not found in the secondary cache (where it should be), new space is allocated in the secondary cache 220 for the information and information is copied from the primary cache into the new location in the secondary cache. Both steps 530 and 540 follow a path to step 550 where information is cleared out of memory regarding the telephone number index from the primary cache. Then, at step 555, the question is asked whether there are any more telephone numbers not processed in primary cache. If there are more telephone numbers to process in the primary cache, then, per step 560, the process is repeated for each remaining telephone number in the primary cache and then the process is repeated again, for example, each fixed time interval selected by the system. If this was the last telephone number during this fixed time interval, then the process is exited at box 570 until the next fixed time interval.

Despite the fact that primary cache memory is sized to be able to handle summary data from one reaping process to the next, there is some possibility that the primary cache memory may approach a full state. In such a situation, it may be appropriate to combine the process described in FIG. 5 with a primary cache memory status monitor such that when the primary cache memory reaches a predetermined degree of fullness, memory may be cleared in the primary cache by performing the process of FIG. 5 during the fixed time interval. For example, when the memory status monitor signals the primary cache is reaching a fullness state, the process of FIG. 5 is invoked. Alternative approaches to such a combination of synchronous and asynchronous reaping may also come to mind in one of ordinary skill in the art.

Although preferred embodiments of the method and apparatus of the invention have been illustrated in the accompanying Drawings and described in the foregoing Detailed Description, it is understood that the invention is not limited to the embodiments disclosed but is capable of numerous rearrangements, modifications, and substitutions without departing from the spirit or scope of the invention as set forth and defined by the following claims.

We claim:

1. A method for storing data in a multiple-level cache arrangement, comprising the steps of:
    initially storing all data in a secondary cache;
    receiving a call at a network switch:
    forwarding Automatic Message Accounting records from said network switch to a call detail database for storage as a call detail record summary indexed by telephone number;
    receiving requests for data;
    moving requested data from said secondary cache to a primary cache, wherein when subsequent requests for data are received, the primary cache is searched before the secondary cache;
    updating said summary of Automatic Message Accounting records; and
    periodically synchronizing and merging data in said primary cache back into said secondary cache to refresh said primary cache and remove stale information,
    wherein said data comprises call detail data indexed by telephone number,
    wherein said call detail data comprises a summary of Automatic Message Accounting records for a telephone number for storage in said call detail database.

2. The method for storing data according to claim 1, wherein all data in said secondary cache is read-only data.

3. The method for storing data according to claim 1, wherein data in said primary cache can be amended.

4. The method according to claim 1, further comprising the step of:
    storing requested data in a third cache if said data has been requested more than a predetermined number of times in a predetermined period of time.

5. A data management system for storing data in a multiple-level cache arrangement, comprising:
    means for initially storing all data in a secondary cache;
    means for receiving a call at a network switch;
    means for forwarding Automatic Message Accounting records from said network switch to a call detail database;
    means for storing forwarded Automatic Message Accounting records as a call detail record summary indexed by telephone number;
    means for receiving requests for data;
    means for moving requested data from secondary cache to a primary cache, wherein when subsequent requests for data are received the primary cache is searched before the secondary cache;
    means for updating said summary of Automatic Message Accounting records; and
    means for periodically synchronizing and merging all data in said primary cache back into said secondary cache to refresh said primary cache and remove stale information,
    wherein said data comprises call detail data indexed by telephone number,
    wherein said call detail data comprises a summary of a plurality of Automatic Message Accounting records indexed by said telephone number for storage in said call detail database for operation upon by one of fraud analysis and call billing programs.

6. The data management system for storing data according to claim 5, wherein all data in said secondary cache is read-only data.

7. The data management system for storing data according to claim 5, wherein data inlaid primary cache can be amended.

8. The data management system for storing data according to claim 5, further comprising:
    means for storing requested data in a third cache if said data has been requested more than a predetermined number of times in a predetermined period of time.

9. The data management system according to claim 5, wherein a switch collects an Automatic Message Accounting record for a given call and forwards said record comprising at least a time of day, a date and a telephone number to said call detail database for storage in summary form as a call detail record summary indexed by telephone number.

10. In a method for storing call detail data in summary form in a multiple-level cache arrangement comprising a primary cache and a secondary cache, a synchronization process comprising the steps of:
    initially storing call detail data in summary form in the secondary cache;
    for each telephone number in the primary cache, looking in the secondary cache for data;
    if found, replacing data in the secondary cache with data from the primary cache and, if not found, allocating new space in the secondary cache and copying the data from the primary cache into the new space in the secondary cache;
    clearing out data for the telephone number from the primary cache; and
    repeating the looking step, one of the replacing and the space allocation and copying steps, and the data clearing step at a predetermined time.

11. A method as recited in claim 10, comprising the initial step of sizing said primary cache to be large enough to hold said summary call detail data from one synchronizing process to the next.

12. A method as recited in claim 10, wherein said synchronizing process further comprises the step of determining if said primary cache is approaching a predetermined degree of fullness.

13. A method as recited in claim 10, wherein said synchronizing process is scheduled at predetermined intervals measured in days and for a time of day when telecommunications traffic is less busy.

14. A method as recited in claim 13, further comprising the step of invoking, responsive to said primary cache approaching a predetermined degree of fullness, a synchronizing process excluding step of storing data in primary cache.

15. The method for storing data according to claim 1, further comprising a step of periodically removing stale information from said secondary cache.

16. The method for storing data according to claim 15, wherein the steps of synchronizing and removing occur simultaneously.

17. The method for storing data according to claim 15, wherein the step of periodically removing stale information from said secondary cache occurs at a time of day when telecommunications traffic is less busy.

18. The data management system for storing data according to claim 5, further comprising means for periodically removing stale information from said secondary cache.

* * * * *

UNITED STATES PATENT AND TRADEMARK OFFICE
CERTIFICATE OF CORRECTION

PATENT NO. : 6,598,119 B2
DATED : July 22, 2003
INVENTOR(S) : Becker et al.

It is certified that error appears in the above-identified patent and that said Letters Patent is hereby corrected as shown below:

<u>Drawings,</u>
Sheet 1 of 7 through Sheet 7 of 7,

The above-identified Sheet 1 of 7 through Sheet 7 of 7 contain informal drawings for the above-identified patent. These sheets should have contained the formal drawings, Figures 1, 2, 2A, 2B, 3, 4, and 5, which have been approved by the Examiner by the Notice of Allowability mailed May 6, 2003. In particular, this Notice indicates that the drawings filed on February 9, 2001 and April 15, 2003 are accepted by the Examiner. Figures 2A and 2B were formal drawings submitted on April 15, 2003 and have been approved by the Examiner at page 2 of the Notice. The above-identified issued patent contains formal drawings for Figures 2A and 2B (Sheet 3 of 7 and Sheet 4 of 7). However, the originally filed drawings, Figures 1, 2, 3, 4, and 5 that were submitted on February 9, 2001, are informal. Three sheets of formal drawings that contained Figures 1, 2, 3, 4, and 5 were submitted on April 27, 2001.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,598,119 B2
DATED : July 22, 2003
INVENTOR(S) : Richard Alan Becker and Allan Reeve Wilks It is certified that error appears in the above-identified patent and that said Letters Patent is hereby corrected as shown below:

Column 8,
Line 5, "inlaid" is replaced with -- in said --

Signed and Sealed this

Fourteenth Day of October, 2003

JAMES E. ROGAN
*Director of the United States Patent and Trademark Office*